United States Patent
Yu et al.

[15] 3,686,363

[45] Aug. 22, 1972

[54] POLYVINYL CHLORIDE-POLYMETHACRYLONITRILE INTERPOLYMER PROCESSING AID FOR POLYVINYL CHLORIDE

[72] Inventors: Arthur J. Yu, Stamford, Conn.; Paul Kraft, Spring Valley, N.Y.

[73] Assignee: Stauffer Chemical Company, New York, N.Y.

[22] Filed: Dec. 4, 1969

[21] Appl. No.: 882,326

[52] U.S. Cl ............... 260/876 R, 260/29.6 AN, 260/296 RD, 260/836, 260/881, 260/898
[51] Int. Cl. .................... C08f 29/24, C08f 29/56
[58] Field of Search ........................... 260/876, 881

[56] References Cited

UNITED STATES PATENTS

| | | | |
|---|---|---|---|
| 3,180,908 | 4/1965 | VanEssen et al. | 260/881 |
| 3,037,948 | 5/1962 | Landler et al. | 260/881 |
| 3,252,880 | 5/1966 | Magat et al. | 260/881 |
| 3,297,791 | 1/1967 | Heaps | 260/876 |
| 3,504,053 | 3/1970 | Williams | 260/876 |

FOREIGN PATENTS OR APPLICATIONS

| | | | |
|---|---|---|---|
| 38/6644 | 5/1963 | Japan | 260/881 |
| 622,897 | 6/1961 | Canada | 260/881 |
| 932,852 | 7/1963 | Great Britain | 260/876 |

*Primary Examiner*—Samuel H. Blech
*Attorney*—Wayne C. Jaeschke, Martin Goldwasser, Paul J. Juettner and Daniel S. Ortiz

[57] ABSTRACT

Interpolymers especially useful as processing aids for polyvinyl chloride (PVC) are prepared by polymerizing vinyl chloride in the presence of polymethacrylonitrile (PMAN) or by polymerizing methacrylonitrile in the presence of polyvinyl chloride. In a preferred method, a conventional PVC polymerization is halted at or near its completion, unreacted monomer is removed, a minor proportion up to about 50 percent of methacrylonitrile (MAN) monomer, based on the weight of the interpolymer, is added and the reaction continued until the MAN polymerizes. The PVC-PMAN interpolymer recovered from such a system is an effective aid in processing conventional PVC, or it can be used per se since it is readily processable by calendering or extruding.

11 Claims, No Drawings

POLYVINYL CHLORIDE-POLYMETHACRYLONITRILE INTERPOLYMER PROCESSING AIR FOR POLYVINYL CHLORIDE

BACKGROUND OF THE INVENTION

When processing polyvinyl chloride, the resin undergoes a fluxing step after which it is fabricated into its desired shape. During this time, the resin must remain stable at the processing and fluxing temperatures. Additionally, the resin must yield under stress, it must have adequate flow properties and it must lend itself to milling and extrusion. Since polyvinyl chloride usually does not itself possess these properties, it has been necessary or desirable to add various processing aids to the resin. For instance, pure acrylic polymers in granular form are dry-mixed with the PVC resin and then milled on a calender or extruded. Alternatively, it is suggested by British Pats. Nos. 1,062,308 and 1,015,334 that the vinyl chloride may be polymerized in the presence of a preformed acrylic polymer or that an acrylic monomer may be added to the polyvinyl chloride latex and polymerized in situ. Specifically, recommended for use in this matter are alkyl acrylates or methacrylates, styrenes and acrylonitrile. The resulting product is an emulsion grade, "porous" polyvinyl chloride blended with the polyacrylate modifier. Such modified polymers and processing aids permit faster calendering with improved gloss, better surface qualities on extrusion, freedom from plating, improved flow and other benefits. However, they must be used in rather substantial proportions when combined with the PVC which is to be processed and the resulting blends must be milled quite intensively in order to achieve these benefits.

Thus, it is among the objects of this invention to provide new and more efficient processing aids for polyvinyl chloride which can be used at lower concentrations. A particular object is to provide, for the first time, a simple method whereby a certain acrylic polymer can be combined with PVC which has been made by either an emulsion or suspension polymerization technique, thereby desirably modifying the processing characteristics of the resulting resin.

BRIEF DESCRIPTION OF THE INVENTION

These and other objects are achieved by the process of this invention which broadly comprises forming an interpolymer of polyvinyl chloride and polymethacrylonitrile. The amount of polymethacrylonitrile in the interpolymer can range from 1 to 99 percent, by weight, with the balance of the interpolymer being PVC; the preferred range of PMAN being about 20 to 50 percent, by weight. It is indeed surprising that these desirable interpolymers, as well as their polyblends with PVC, can be achieved only by the use of methacrylonitrile. Thus, acrylonitrile, for instance, is entirely inoperable in the process of this invention. It is also surprising that the full advantages of this invention are not realized by simply copolymerizing a mixture of vinyl chloride and methacrylonitrile. Moreover, we have found that physically mixing PVC and PMAN is a rather difficult and time consuming process which requires the use of high concentrations of the costly PMAN and of added stabilizers in order to achieve a suitable product. Although such an approach is feasible, it is not a desirable method of improving the processibility of PVC as compared with the novel process of this invention as set forth hereinbelow. Thus, it is necessary, rather, that either of these monomers, i.e. either vinyl chloride or methacrylonitile, be first polymerized whereupon the second monomer, i.e. the vinyl chloride or the methacrylonitrile, must then be polymerized in the presence of the initially preformed polymer. Apparently, the second monomer is absorbed by and polymerized within the particles of the initially preformed polymer and thereby produces a modified PVC resin which serves as an effective processing aid for blending with additional polyvinyl chloride or which can be processed per se without the addition of any other processing aid.

This invention is therefore seen to relate to interpolymers of PVC and PMAN as well as their preparation and use. More specifically, it relates to interpolymers of polyvinyl chloride and polymethacrylonitrile as well as the polyblends of these interpolymers with PVC. It has been found, unexpectedly, that these PVC-PMAN interpolymers function as PVC processing aids with the major advantage that they can be used at lower levels of methacrylonitrile than is possible with the usual commercial polymethyl methacrylate-polyethyl acrylate (PMMA-PEA) processing aids.

DETAILED DESCRIPTION OF THE INVENTION

According to a preferred specific embodiment of this invention, polyvinyl chloride or a copolymer of vinyl chloride with a minor proportion of vinyl acetate is first prepared by conventional suspension polymerization procedures whereupon unreacted vinyl chloride is removed from the system after the polymerization is at least about 60 percent complete. A proportion of a second, i.e. an active, monomer system containing methacrylonitrile in an amount such that the resulting interpolymer will contain at least 1 percent and no more than about 99 percent by weight of MAN, is then added. This second monomer system can contain methacrylonitrile alone or in admixture with up to about 50 percent, by weight, of the second monomer system, of one or more ethylenically unsaturated monomers. The polymerization is thereupon continued until this active monomer or monomer mixture is polymerized.

In the resulting interpolymer, the polymethacrylonitrile, or copolymer thereof, comprises from about 1 to about 99 percent, by weight, and preferably from about 20 to 50 percent, by weight, of its total solids content while the polyvinyl chloride comprises from about 1 to 99 percent and preferably from about 50 to 80 percent, by weight, of the resulting interpolymer. It is important that the active or second monomer system which is employed consist preferably of about 50 to 100 percent, by weight, of methacrylonitrile. However, as a minor component of this active or second monomer system, up to about 50 percent, by weight, and preferably from about 5 to 25 percent, by weight, of the second monomer system may consist of one or more monomers selected from the group consisting of vinylidene chloride; acrylonitrile; vinyl chloride; the $C_1$—$C_3$ alkyl esters of methacrylic acid such, for example, as methyl, ethyl, n-propyl and iso-propyl methacrylate; glycidyl methacrylate; and the $C_1$—$C_{12}$ or higher alkyl esters of acrylic acid wherein the alkyl group may be straight or branched such, for example, as methyl, iso-propyl, 2-ethylhexyl or lauryl acrylate. Especially preferred are second monomer systems containing 75 to 95 percent, by weight, of methacrylonitrile with 5 to 25 percent, by weight, of methyl methacrylate, methyl acrylate, ethyl methacrylate, ethyl acrylate, and/or glycidyl methacrylate. Thus, one or more of these optional ethylenically unsaturated monomers may be present in the resulting interpolymer in a concentration of up to about 49.5 percent of its total weight.

It has been found that by intimately admixing minor proportions of the interpolymer processing aids thus obtained with polyvinyl chloride resins, the resultant mixtures are substantially easier to process than the unmodified polyvinyl chloride. Possible concentrations of the new interpolymers in these polyblends are such that the polyvinyl chloride, whether derived from the interpolymer or from the PVC being modified, is present in a total concentration of from about 51 to about 99 percent, by weight, while the balance of from about 49 to 1 percent, by weight, of the polyblend is the PMAN or a copolymer of MAN with one or more of the above described ethylenically unsaturated monomers. A preferred embodiment comprises polyblends in which the concentration of PMAN or its copolymers is from about 2 to 15 percent of the total weight of the polyblend. When evaluated in a Brabender plastograph, the resulting easy processing polyblends are characterized by their shortened flux times. The PMAN-modified PVC processing aids which contain the proportions of between about 20 and 50 percent, by weight, PMAN and from about 50 to 80 percent, by weight, of polyvinyl chloride, offer a decided advantage over PVC processing aids which comprise polymers of lower alkyl acrylic acid esters. Where the resulting interpolymer contains less than about 10 percent, by weight, of PMAN or of a MAN copolymer, it may be used, per se, as an easy processing resin.

The preferred process of this invention comprises adding the appropriate amount of methacrylonitrile to an aqueous suspension of polyvinyl chloride, particularly PVC obtained by suspension polymerization and having an average particle size of from about 5 to 150 microns and preferably about 25 to 80 microns. The particle size of the PVC is an important consideration in the process of this invention. The reason for this is not entirely understood but is believed to relate to the fact that the methacrylonitrile is, in some manner, more readily absorbed by PVC particles whose particle size is substantially within the above specified range and thus polymerizes more effectively. Polymerization of the MAN is initiated by a standard oil-soluble catalyst which may be either already present in the suspension or which may be freshly added to it. The particular catalyst, temperature, reaction time and other operating conditions which are chosen are, of course, interdependent and may be those usually employed in the polymerization of acrylic monomers of this type. A chain transfer agent may be used, if desired, but it is noteworthy that such an agent is not required as is often found to be necessary in prior art processes in this field. Other variations in polymerization technique will suggest themselves to those skilled in the art.

The process of this invention is particularly useful with polyvinyl chloride homopolymers but there can also be employed the usual copolymers of vinyl chloride with minor proportions of vinyl acetate provided that such copolymers are within the above specified particle size range. Similarly, the processing aids resulting from this novel process are especially desirable for incorporation in PVC as well as in vinyl chloride-vinyl acetate copolymers which, as is known, are quite difficult to calender.

For reasons of economy and efficiency, it is preferable that the PVC be initially polymerized until the reaction is at least about 60 percent and, preferably about 80 percent or more complete. Unreacted vinyl chloride must then be removed when the system is vented before the MAN, or MAN comonomer mixture, can be added and polymerized. If this is not done, the remaining vinyl chloride monomer will undergo an undesirable copolymerization with the MAN. This utilization of sequential polymerization, i.e. of first polymerizing one of the monomers prior to introducing and then polymerizing the other, is a unique and important aspect of the process of this invention. The methacrylonitrile polymerization may be carried out in the same vessel immediately after the vinyl chloride polymerization is completed or the PVC may have been previously prepared, stored and then used in this process. However, if the MAN, or MAN comonomer mixture, polymerization is carried out in situ as soon as the PVC system has been vented and unreacted monomer removed, it may not be necessary to add any additional catalyst.

When PVC is the major component of these new interpolymers, it is generally preferred to first polymerize the vinyl chloride and to then polymerize the methacrylonitrile in its presence. However, the reverse sequence is equally feasible, i.e., first forming the polymethacrylonitrile, or a copolymer of MAN with a $C_1$—$C_3$ alkyl methacrylate ester, glycidyl methacrylate or a $C_1$—$C_{12}$ alkyl acrylate ester removing unreacted MAN and any other unreacted monomers, and then polymerizing the vinyl chloride in the presence of the PMAN or MAN copolymer. Here again, the second polymerization step may follow immediately in situ, or a preformed PMAN or MAN copolymer may be stored and used at a later date.

The following examples will further illustrate the embodiment of this invention. In these examples, all parts given are by weight unless otherwise noted.

EXAMPLE I

An autoclave was charged with 210 parts, by weight, of suspension grade polyvinyl chloride resin (Rel. Visc. of 2.02 as determined in a 1 percent, by weight, cyclohexanone solution at 25° C.) having a particle size between about 50 and 80 microns, 900 parts of deionized water, 90 parts of methacrylonitrile and, as a catalyst, 0.27 parts of 2,2'-azobisisobutyronitrile. The autoclave was heated to 85° C. and agitated at this temperature for three hours. A second addition comprising 0.27 parts of the latter catalyst was then made and the temperature was increased to 95° C. and maintained at this level for one hour. The reactor was then cooled and the contents collected via filtration. The resultant interpolymer was then dried overnight in an oven set at 50° C.

Conversion = 90 percent of the MAN to polymethacrylonitrile.

Composition, based on conversion of MAN to polymer = 27.8 percent. PMAN/72.2 percent PVC, by weight.

This PVC/PMAN interpolymer was compared (1) with a sample of PVC which had not been admixed with a processing aid; (2) with a sample of PVC to which this PVC/PMAN interpolymer had been added; and (3) with a sample of PVC containing a commercial processing aid (K–120–N, Rohm and Haas brand name for a copolymer of about 90 percent methyl methacrylate and 10 percent ethyl acrylate). The results of this comparison showed that the novel composition of this invention could be used as a processing aid at a substantially lower concentration level than was possible with the commercial processing aid while still providing desirable milling characteristics to the PVC as evidenced by its good gloss and clarity.

EXAMPLE II

The polymerization procedure of Example I was repeated using 210 parts, by weight, of suspension grade PVC which was substantially free of unreacted monomer and having a particle size between about 50 and 80 microns. It was conducted in 900 parts of water and involved the addition of 90 parts of a monomer mixture consisting of 90 percent, by weight, of MAN and 10 percent, by weight, of methyl methacrylate. The monomer mixture was rapidly absorbed into the PVC phase while it was stirred and heated at 90° C. After 2 hours, the monomer mixture was essentially polymerized within the host polymer and the resulting interpolymer product analyzed as a 76 percent PVC:24 percent PMAN-PMMA interpolymer. This material served as an effective processing aid for polyvinyl chloride resin at a concentration level which was only one-half the total concentration of an acrylic ester polymer of the type found in a commercial PMMA-PEA processing aid.

EXAMPLE III

The procedure of Example II was repeated with the exception, in this instance, that the 90:10 MAN:MMA monomer mixture was replaced, respectively, with: (a) a mixture of 90 percent MAN and 10 percent ethyl acrylate; (b) a mixture of 85 percent MAN and 15 percent glycidyl methacrylate; (c) a mixture of 95 percent MAN and 5 percent ethyl methacrylate; and (d) a mixture of 50 percent MAN and 50 percent methyl acrylate. In each instance, the resulting interpolymer was incorporated into a rigid PVC formulation at concentration levels such that the resulting polyblends contained, respectively, 3 and 10 percent of the MAN copolymer as based on the total weight of the polyblends. These interpolymers were then compared with a commercially available lower alkyl acrylic acid ester polymer processing aid at equivalent acrylic ester polymer levels and, under standard milling conditions, the products of this invention exhibited improved behavior both on the mill and in the finished sheets.

EXAMPLE IV

The procedure of Example I was repeated three times using mixtures of PVC and MAN whose proportions, by weight, were, respectively, 85 PVC:15 MAN, 50 PVC:50 MAN and 60 PVC:40 MAN. In each case, useful processing aids comparable to the product of Example I were obtained.

EXAMPLE V

An autoclave was charged with 197 parts of monomeric vinyl chloride, 0.13 parts of 2,2'-azobisisobutyronitrile, 435 parts of deionized water, 75 parts of a 1 percent aqueous solution of methyl cellulose and 3 parts of a previously prepared methacrylonitrile:methyl methacrylate (95:5) copolymer. The temperature of the reactor was maintained at 60° C. while agitation was simultaneously applied at a rate of 41 rpm throughout the entire 10 hour reaction period. The reactor was then cooled and the contents collected via filtration. The resultant interpolymer was then dried overnight in an oven set at 50° C.

Conversion was calculated as 94 percent of vinyl chloride to PVC and the product was analyzed at a 98.5 percent PVC:1.5 percent PMAN-PMMA interpolymer. It was found to provide excellent results, per se, as an easy processing resin.

EXAMPLE VI

An autoclave was charged with 197 parts of monomeric vinyl chloride, 0.13 parts of 2,2'-azobisisobutyronitrile, 435 parts of deionized water, 40 parts of 1 percent aqueous solution of methyl cellulose, and 3 parts of a previously prepared methacrylonitrile:methyl methacrylate (95:5) copolymer. The temperature of the reactor was maintained at 60° C. while agitation was simultaneously applied at a rate of 48 rpm throughout the entire 10 hour reaction period. The reactor was then cooled and the contents collected via filtration. The resultant interpolymer was then dried overnight in an oven set at 50° C. Conversion was calculated as 100 percent of vinyl chloride to PVC and the product was analyzed as a 98.5 percent PVC:1.5 percent PMAN-PMMA interpolymer. It was found to provide excellent results, per se, as an easy processing resin.

Variations may be made in proportions, procedures and materials without departing from the scope of this invention as defined in the following claims.

What is claimed is:

1. An interpolymer comprising from about 1 to 99 percent, by weight, of a polymer selected from the group consisting of polyvinyl chloride and copolymers of vinyl chloride with a minor proportion of vinyl acetate and from about 1 to 99 percent, by weight, of a polymer selected from the group consisting of polymethacrylonitrile and copolymers of methacrylonitrile with up to about 25 percent, by weight, of at least one monomer selected from a group consisting of vinylidene chloride, vinyl chloride, acrylonitrile, glycidyl methacrylate, the $C_1$—$C_3$ alkyl methacrylate esters, the $C_1$—$C_{12}$ alkyl acrylate esters and mixtures thereof; said interpolymer resulting from the suspension polymerization of vinyl chloride in the presence of a previously prepared aqueous suspension of a substantially monomer free polymer selected from the group consisting of polymethacrylonitrile and copolymers of methacrylonitrile with up to about 25 percent, by weight, of at least one monomer selected from the group consisting of vinylidene chloride, vinyl chloride, acrylonitrile, glycidyl methacrylate, the $C_1$—$C_3$ alkyl methacrylate esters, the $C_1$—$C_{12}$ alkyl acrylate esters and mixtures thereof.

2. A method for the preparation of interpolymers of polyvinyl chloride and polymethacrylonitrile which comprises the steps of: (1) preparing, by means of a suspension polymerization procedure, a substantially monomer free polymer of methacrylonitrile; (2) polymerizing vinyl chloride by means of a suspension polymerization procedure in the presence of the methacrylonitrile polymer resulting from step (1); and (3) recovering the interpolymer of polyvinyl chloride and polymethacrylonitrile thereby obtained.

3. The method of claim 2, wherein said polymer of methacrylonitrile comprises from at least about 50 to 100 percent, by weight, of methacrylonitrile together with from about 50 to 0 percent, by weight, of at least one other ethylenically unsaturated monomer.

4. The method of claim 2, wherein the concentration of vinyl chloride with respect to the polymer of methacrylonitrile resulting from step (1), is such that the resulting interpolymer contains from about 1 to 99 percent, by weight, of vinyl chloride.

5. The method of claim 3, wherein said methacrylonitrile and said ethylenically unsaturated monomer are in the relative proportions of from about 50 to about 95 percent, by weight, of methacrylonitrile to about 50 to about 5 percent of said ethylenically unsaturated monomer.

6. The method of claim 2, wherein the vinyl chloride polymer prepared in step (2) is a copolymer of vinyl chloride with a minor proportion of vinyl acetate.

7. The method of claim 3, wherein said ethylenically unsaturated monomer is selected from the group consisting of vinylidene chloride, vinyl chloride, acrylonitrile, glycidyl methacrylate, the $C_1$—$C_3$ alkyl esters of methacrylic acid, the $C_1$—$C_{12}$ alkyl esters of acrylic acid and mixtures thereof.

8. The interpolymer resulting from the process of claim 2.

9. A method for the preparation of processing aids for polyvinyl chloride, which comprises suspension polymerizing vinyl chloride in the presence of an aqueous suspension of substantially monomer free polymethacrylonitrile.

10. The method of improving the processability of polyvinyl chloride, which comprises preparing a polyblend by mixing said polyvinyl chloride, prior to processing, with an interpolymer produced by the process of claim 2 in sufficient amount to provide between about 1 and about 49 percent of polymethacrylonitrile based on the total weight of the resulting polyblend.

11. A polyblend comprising polyvinyl chloride in physical admixture with a minor proportion of an interpolymer consisting essentially of from about 1 – 99 percent, by weight, of a polymer selected from the group consisting of polyvinyl chloride and copolymers of vinyl chloride with a minor proportion of vinyl acetate together with from about 99 – 1 percent, by weight, of a second polymer which is selected from the group consisting of polymethacrylonitrile and copolymers of methacrylonitrile with up to about 25 percent, by weight, of at least one monomer selected from the group consisting of vinylidene chloride, vinyl chloride, acrylonitrile, glycidyl methacrylate, the $C_1$—$C_3$ alkyl methacrylate esters, the $C_1$—$C_{12}$ alkyl acrylate esters and mixtures thereof; said interpolymer resulting from the suspension polymerization of vinyl chloride in the presence of a previously prepared aqueous suspension of a substantially monomer free polymer selected from the group consisting of polymethacrylonitrile and copolymers of methacrylonitrile with up to about 25 percent, by weight, of at least one monomer selected from the group consisting of vinylidene chloride, vinyl chloride, acrylonitrile, glycidyl methacrylate, the $C_1$—$C_3$ alkyl methacrylate esters, the $C_1$—$C_{12}$ alkyl acrylate esters and mixtures thereof.

* * * * *